US009782959B2

(12) United States Patent
Shimizu

(10) Patent No.: US 9,782,959 B2
(45) Date of Patent: Oct. 10, 2017

(54) MANUFACTURING METHOD FOR LAMINATED IRON CORE

(71) Applicant: MITSUI HIGH-TEC, INC., Kitakyushi-shi, Fukuoka (JP)

(72) Inventor: Koji Shimizu, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 0 days.

(21) Appl. No.: 14/798,656

(22) Filed: Jul. 14, 2015

(65) Prior Publication Data
US 2016/0023447 A1   Jan. 28, 2016

(30) Foreign Application Priority Data

Jul. 24, 2014   (JP) .................................. 2014-150908

(51) Int. Cl.
*B32B 37/10* (2006.01)
*H01F 41/00* (2006.01)
(Continued)

(52) U.S. Cl.
CPC .............. *B32B 37/10* (2013.01); *B32B 15/18* (2013.01); *H01F 41/005* (2013.01);
(Continued)

(58) Field of Classification Search
CPC .... H02K 2201/09; H02K 1/148; H02K 1/146; H02K 1/06; H02K 1/04; H02K 41/02;
(Continued)

(56) References Cited

U.S. PATENT DOCUMENTS

| | | | | | |
|---|---|---|---|---|---|
| 2,318,095 | A | * | 5/1943 | Putman | ............... H01F 27/2455 264/248 |
| 5,191,698 | A | * | 3/1993 | Sumi | ..................... D06F 37/304 29/596 |
| 5,261,152 | A | * | 11/1993 | Simozaki | ............ H01F 41/0226 29/609 |

FOREIGN PATENT DOCUMENTS

| | | |
|---|---|---|
| JP | 61-189930 | 8/1986 |
| JP | 7-63211 | 7/1995 |

(Continued)

OTHER PUBLICATIONS

Machine translation of Yukigaya (JP 07-063211), Jul. 1995.*
(Continued)

*Primary Examiner* — Philip Tucker
*Assistant Examiner* — Jimmy R Smith, Jr.

(57) ABSTRACT

A manufacturing method for laminated iron cores includes processing a metal sheet to form product sheets, in each of which iron core pieces are arranged inside an outer frame piece and the iron core pieces are connected to the outer frame piece in such a way that outer peripheral sides of the iron core pieces are connected to nearest parts of the outer frame piece through bridge pieces, laminating the product sheets and temporarily fixing the product sheets adjacent to each other in a vertical direction together to form a sheets laminated body including iron core pieces laminated parts and bridge pieces laminated parts, sealing the iron core pieces laminated parts by a resin while being pressurized to form pre-formed laminated iron cores, and separating the bridge pieces laminated parts from the pre-formed laminated iron cores to form the laminated iron cores which are individually separated.

8 Claims, 9 Drawing Sheets

(51) Int. Cl.
  *H02K 15/02* (2006.01)
  *H01F 41/02* (2006.01)
  *B32B 15/18* (2006.01)
  *B32B 37/12* (2006.01)
  *B32B 38/04* (2006.01)
  *B32B 38/10* (2006.01)

(52) U.S. Cl.
  CPC ......... *H01F 41/0233* (2013.01); *H02K 15/02* (2013.01); *B32B 37/12* (2013.01); *B32B 38/04* (2013.01); *B32B 38/10* (2013.01); *B32B 2307/208* (2013.01); *B32B 2311/30* (2013.01); *B32B 2457/00* (2013.01)

(58) Field of Classification Search
  CPC . Y10T 29/49078; H01F 41/0233; H01F 3/02; H01F 41/02; H01F 41/0206; H01F 41/005; Y10S 29/904; B29C 39/10; B29C 45/14639; B29C 45/14; B29C 45/1459; B32B 15/18; B32B 2307/208; B32B 2311/30; B32B 37/10
  See application file for complete search history.

(56) References Cited

FOREIGN PATENT DOCUMENTS

| | | |
|---|---|---|
| JP | 9-215279 | 8/1997 |
| JP | 2001298916 A * | 10/2001 |
| JP | 2008-262944 | 10/2008 |

OTHER PUBLICATIONS

Machine translation of JP2001298916, Oct. 2001.*
EPO Machine translation of JP2008262944, Oct. 2008.*
Partial human translation of JP2008-262944A, Moronowaki, Y., Oct. 2008.*

* cited by examiner

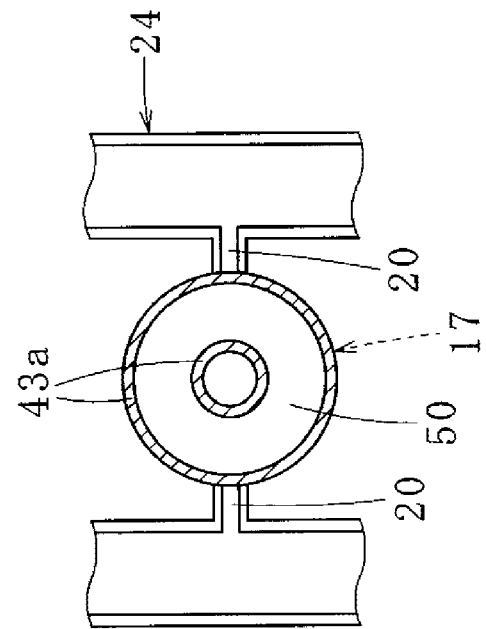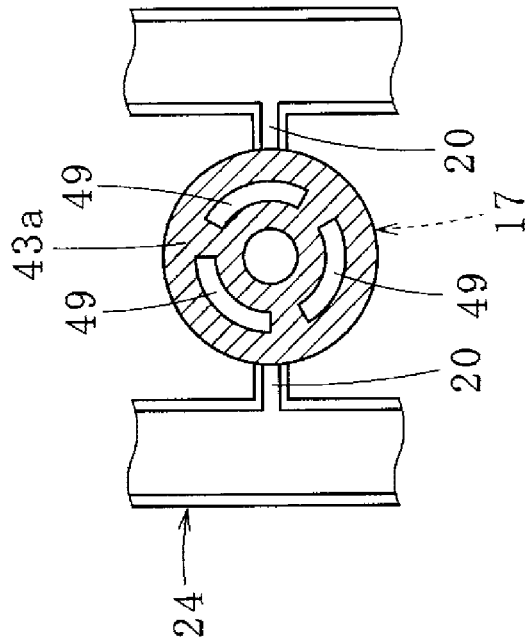

MANUFACTURING METHOD FOR LAMINATED IRON CORE

CROSS REFERENCE TO RELATED APPLICATION(S)

This application is based upon and claims the benefit of priority of Japanese Patent Application No. 2014-150908 filed on Jul. 24, 2014, the contents of which are incorporated herein by reference in its entirety.

BACKGROUND OF THE INVENTION

1. Field of the Invention

The present invention relates to a manufacturing method for a laminated iron core.

2. Description of the Related Art

As a magnetic material used in a motor, a transformer and a reactor which can reduce an iron loss especially to reduce electric power consumption, for instance, amorphous metal is used. Since the amorphous metal whose thickness is very small as thin as 50 μm or lower, a laminated iron core formed by laminating iron core pieces made of the amorphous metal can lower an eddy current loss.

As a method for manufacturing the laminated iron core by using the amorphous metal, a method is disclosed in, for instance, JP-A-61-189930, that as shown in FIG. 7A and FIG. 7B, amorphous thin metal sheets 82 having iron core pieces (product parts) 81 respectively held inside through a plurality of connection pieces 80 are sequentially bonded together by an adhesive agent 83 to form a laminated body of the thin metal sheets 82, and then, laminated parts having the connection pieces 80 laminated in the formed laminated body are cut to separate and take out the laminated iron core with the iron core pieces 81 laminated from the laminated body.

Further, as shown in FIG. 8, according to JP-A-2008-262944, a laminated iron core 87 is obtained in such a manner that a resin 85 is applied to a thin metal sheet 84 in the desired forms of iron core pieces (product forms) so as to arrange and configure iron core piece form parts 86, then, an area in the thin metal sheet 84 to which the resin 85 is not applied is removed by an etching process, and a plurality of left iron core piece form parts 86 (including resin layers 86a of iron core piece forms and thin metal sheet pieces 86b in lower sides thereof) are laminated and the thin metal sheet pieces 86b are bonded together through the resin layers 86a present between the upper and lower thin metal sheet pieces 86b as adhesive agents.

Further, as shown in FIG. 9, JP-A-9-215279 discloses a laminated iron core formed in such a way that a plurality (two sheets in this example) of metal sheet materials 88 are bonded together by an adhesive agent 89, then, a first laminated iron core piece 92 in which a caulking protrusion 90 and a caulking through hole 91 are alternately arranged along, for instance, a circumference and a second laminated iron core piece 95 in which a caulking through hole 93 to which the caulking protrusion 90 is fitted and a caulking protrusion 94 fitted to the caulking through hole 91 are alternately arranged along a circumference are sequentially formed and laminated and the caulking protrusions 90 and 94 arranged in an upper side are fitted to the through holes 93 and 91 arranged in a lower side and caulked and connected together. A laminated iron core piece 96 to be separated is removed after the laminated iron core is formed and includes a through hole 97 to which a caulking protrusion of a laminated iron core piece of a lowermost layer which forms the laminated iron core (a caulking protrusion 90 of a first laminated iron core piece 92 in the drawing) is fitted. Thus, a deformation of the laminated iron core piece of the lowermost layer is prevented during a caulking connection and the laminated iron core piece of the lowermost layer is supported in a horizontal state.

Patent Literature 1: JP-A-61-189930
Patent Literature 2: JP-A-2008-262944
Patent Literature 3: JP-A-9-215279

SUMMARY OF THE INVENTION

A thickness of a thin metal sheet formed with an electromagnetic steel sheet (thus, a thickness of an iron core piece) is, for instance, 0.15 to 0.5 mm. As compared therewith, the thickness of a thin metal sheet formed with amorphous metal is, for instance, 50 μm or lower. Accordingly, when laminated iron cores having the same thickness are manufactured, if the iron core pieces formed with the thin metal sheet made of the amorphous metal are used, the number of laminated iron core pieces is extremely large, so that a high productivity is required. However, as shown in JP-A-61-189930, JP-A-2008-262944 and JP-A-9-215279, in the method for manufacturing the laminated iron core by bonding together the iron core pieces formed from the thin metal sheet made of the amorphous metal by using the adhesive agent, since a process that the adhesive agent is applied thereto is necessary, a problem arises that manufacturing processes are long to restrict an improvement of the productivity. Further, when the thin metal sheet made of the amorphous metal to which the adhesive agent is applied is used, a problem also arises that a treatment is difficult or a management is troublesome in conveying the thin metal sheet or forming the iron core pieces.

On the other hand, the method for manufacturing the laminated iron core by laminating the iron core pieces to form the iron core pieces integrally by caulking is advantageously excellent in its productivity. However, the method has a problem that since the thickness of the iron core piece is small, a caulking strength is low, so that the laminated iron core cannot be obtained which has the iron core pieces (layer to layer) strongly stuck together. Accordingly, in the obtained laminated iron core, a problem arises that since the laminated iron core is liable to break during transportation and connections of the iron core pieces are partly detached to deteriorate the strength of the laminated iron core, the laminated iron core is hardly handled.

It is a non-limited object of the present invention to provide a manufacturing method for a laminated iron core excellent in its productivity and a laminated iron core which has a breakage or flaws hardly formed and is easily handled.

An aspect of the present invention provides a manufacturing method for laminated iron cores, the manufacturing method including: processing a metal sheet having a configuration of a long strip or a belt to form a plurality of product sheets, in each of which a plurality of iron core pieces are arranged inside an outer frame piece and the plurality of iron core pieces are connected to the outer frame piece in such a way that outer peripheral sides of the iron core pieces are connected to nearest parts of the outer frame piece through bridge pieces; laminating the plurality of product sheets and temporarily fixing the plurality of product sheets adjacent to each other in a vertical direction together to form a sheets laminated body including iron core pieces laminated parts in which the iron core pieces are laminated in the vertical direction and bridge pieces laminated parts in which the bridge pieces are laminated in the vertical direction; sealing the iron core pieces laminated parts by a resin while being pressed by a pressing member to form pre-formed laminated iron cores; and separating the bridge pieces laminated parts from the pre-formed laminated iron cores to form the laminated iron cores which are individually separated.

The manufacturing method may be configured such that each of the product sheets are formed in which the plurality of iron core pieces are arranged longitudinally and transversely inside the outer frame piece, the iron core pieces which are adjacent in a longitudinal direction, a transverse direction or an oblique direction are respectively connected together by second bridge pieces, and the bridge pieces laminated parts and second bridge pieces laminated parts in which the second bridge pieces are laminated in the vertical direction are separated from the pre-formed laminated iron cores to form the laminated iron cores which are individually separated.

The manufacturing method may be configured such that the product sheets which are adjacent in the vertical direction are temporarily fixed together in either or both of parts of the bridge pieces and the outer frame piece.

The manufacturing method may be configured such that the metal sheet is an amorphous metal sheet.

The manufacturing method may be configured such that each laminated iron core is covered with a resin layer, and the metal sheet remain exposed without resin-sealing in parts of upper and lower surfaces and an outer peripheral surface of the laminated iron core due to the pressurizing the iron core pieces laminated parts and separating the bridge pieces laminated parts.

According to the manufacturing method for the laminated iron core according to the first aspect of the present invention, in the sheets laminated body obtained in such a way that the metal sheet is processed to form the product sheet having the iron core pieces arranged and formed and the product sheets are laminated, since the iron core pieces laminated parts having the iron core pieces laminated are sealed by a resin to form the plurality of pre-formed laminated iron cores at the same time, for instance, even when the metal sheet is a thin metal sheet made of amorphous metal, a process that the metal sheets are bonded together by an adhesive agent as in the usual manufacturing method is not present so that processes are shortened to make a transportation of the metal sheet or a treatment thereof easy during a processing operation. Even when the number of laminated metal sheets is increased, a productivity of the pre-formed laminated iron cores can be improved, and thus, a productivity of the laminated iron cores individually separated from the pre-formed laminated iron cores can be improved.

Further, since the iron core pieces laminated parts are pressurized from a vertical direction, sealed by the resin and formed integrally to manufacture the pre-formed laminated iron cores with the iron core pieces closely and strongly stuck together, a breakage of the laminated iron cores which are individually divided from the pre-formed laminated iron cores during a transportation of the laminated iron cores or a damage of the laminated iron cores due to a partial detachment of connections of the iron core pieces can be prevented. Further, since coating layers of the resin (resin layers) are provided on the surfaces of the laminated iron cores, an impact can be prevented from being directly applied to the iron core pieces during the transportation or the laminated iron cores can be prevented from being caught by the iron core pieces to generate flaws during the transportation. Thus, the laminated iron cores are easily handled.

In the laminated iron core as manufactured, since a configuration processing for a caulking connection or a welding work is not directly applied to the iron core pieces, a residual stress or a working part is not present which deteriorates a property of the laminated iron core. Thus, the performance of the laminated iron core can be improved.

BRIEF DESCRIPTION OF THE DRAWINGS

In the accompanying drawings:

FIG. 5A is a plan view of an iron core pieces laminated part sealed by a resin by using a pressing member in a first modified example;

FIG. 5B is a plan view of an iron core pieces laminated part sealed by a resin by using a pressing member in a second modified example;

DETAILED DESCRIPTION OF THE EXEMPLARY EMBODIMENTS

Subsequently, by referring to the accompanying drawings, an exemplary embodiment which embodies an aspect of the present invention will be described below to understand the present invention.

Figure 1A:
FIGS. 1A to 1E are process explanatory views in a manufacturing method for a laminated iron core according to one exemplary embodiment of the present invention.
Figure 1B:
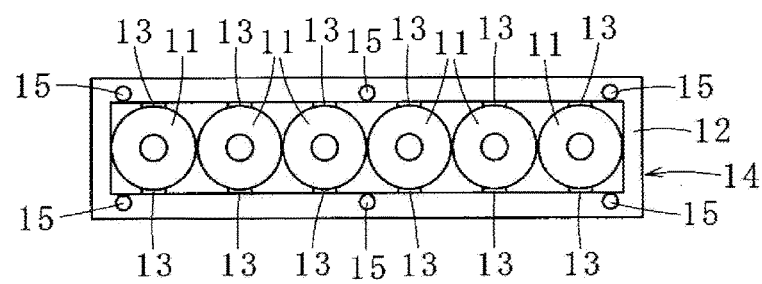

A manufacturing method for a laminated iron core according to one exemplary embodiment of the present invention includes a process (a form working process) that an amorphous metal sheet having a configuration of a long strip (an example of a metal sheet, refer it also simply to as a metal sheet, hereinafter) 10 shown in FIG. 1A is, for instance, blanked to form a product sheet 14, as shown in FIG. 1B, in which a plurality of annular iron core pieces 11 are arranged inside an outer frame piece 12 and the iron core pieces 11 are respectively connected to the outer frame piece 12 in such a way that outer peripheral sides of the iron core pieces 11 are connected to nearest inner peripheral sides of the outer frame piece 12 through bridge pieces 13. FIG. 1B also shows pilot holes 15 into which pilot pins for positioning the metal sheet 10 are inserted when the metal sheet 10 is sequentially moved in accordance with a blanking or stamping work in a blanking or stamping device (not shown in the drawing).

The amorphous metal sheet 10 may be worked one sheet by one sheet. Alternatively, a plurality of amorphous metal sheets may be supplied to the blanking or stamping device under a state that they are piled, and blanked or stamped at the same time to form a plurality of product sheets at the same time. In the alternative method, a productive efficiency of the product sheets can be improved.

Figure 1C:
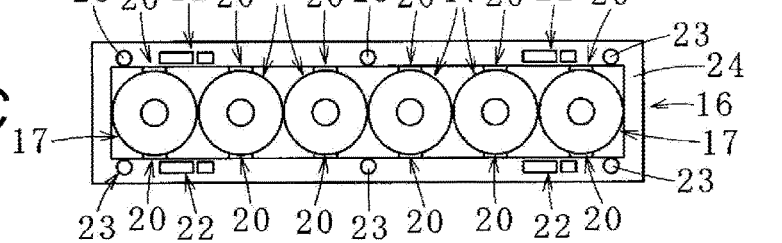
Figure 1D:
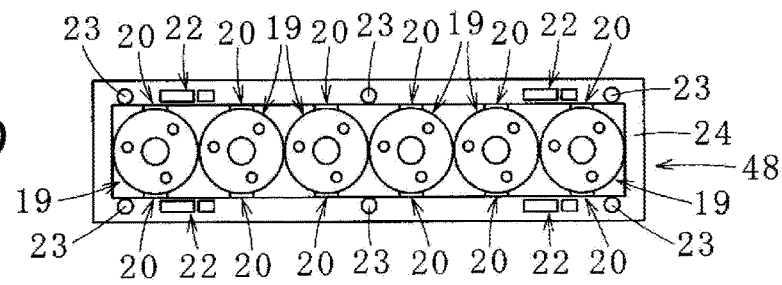
Figure 1E:
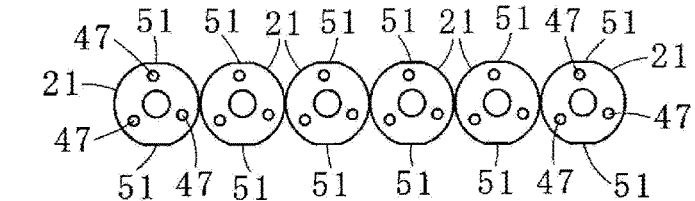
Figure 1F:
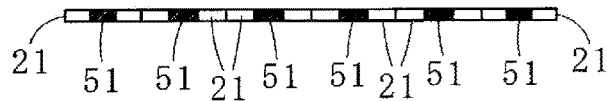
FIG. 1F is a side view of the laminated iron core.

Further, the method for manufacturing the laminated iron core according to the one exemplary embodiment of the present invention includes a process (a temporarily fixing process), as shown in FIG. 1C, that the plurality of product sheets 14 are laminated, the product sheets which are adjacent to each other in a vertical direction are caulked and connected together (one example of a temporary connection) to form a sheets laminated body 16, a process (a mold process), as shown in FIG. 1D, that iron core pieces laminated parts 17 in which the iron core pieces 11 are piled in the vertical direction in the sheets laminated body 16 are respectively pressurized through a plurality of lower pressing pins 18 (one examples of a pressing member, see FIG. 2A) from a lower side and a plurality of upper pressing pins 18a (one examples of a pressing member, see FIG. 2A) from an upper side and sealed by a resin to form a pre-formed laminated iron core 19 and a process (a separating process for forming individual laminated iron cores), as shown in FIGS. 1E and 1F, that bridge pieces laminated parts 20 having the bridge pieces 13 piled in the vertical direction are separated from the pre-formed laminated iron core 19 by using, for instance, a dicing blade (not shown in the drawing) to form laminated iron cores 21 which are individually separated.

FIGS. 1C and 1D show caulking and connecting parts 22 for a temporary connection which are formed in the outer frame piece 12 by the blanking or stamping device, through parts 23 formed by allowing the pilot holes 15 to communicate, and a frames laminated part 24 having the outer frame pieces 12 piled in the vertical direction.

In the temporarily fixing process, since the product sheets 14 are caulked and connected together to form the sheets laminated body 16, a productivity of the sheets laminated body 16 can be improved, and thus, a productivity of the laminated iron cores 21 can be improved. In the product sheet 14, since the caulking and connecting part 22 is formed in the outer frame piece 12, a blanking or stamping work part (a caulking protrusion and a caulking through hole to which the caulking protrusion is fitted) is not formed in the iron core pieces 11, and further, a residual stress due to a blanking or stamping work is not generated. Thus, a magnetic property of the laminated iron core 21 formed with the iron core pieces laminated part 17 having the iron core pieces 11 laminated can be improved.

Here, the caulking and connecting parts 22 used for caulking and connecting together the product sheets 14 which are adjacent in the vertical direction are formed on the outer frame pieces 12 by using the blanking or stamping device. Alternatively, the caulking and connecting parts 22 may be formed in the bridge pieces 13 or both in the bridge pieces 13 and the outer frame pieces 12.

Further, the product sheets 14 are caulked and connected together to form the sheets laminated body 16. However, parts of either or both of the bridge pieces 13 and the outer frame pieces 12 of the laminated product sheets 14 may be bonded together through an adhesive agent and temporarily fixed, or parts of either or both of the bridge pieces 13 and the outer frame pieces 12 of the laminated product sheets 14 may be welded and temporarily fixed, so that the sheets laminated body 16 can be formed.

Further, an annealing process may be added after the configuration working process or the temporarily fixing process as required so as to remove the residual stress of the product sheets or the sheets laminated body.

Figure 2A:
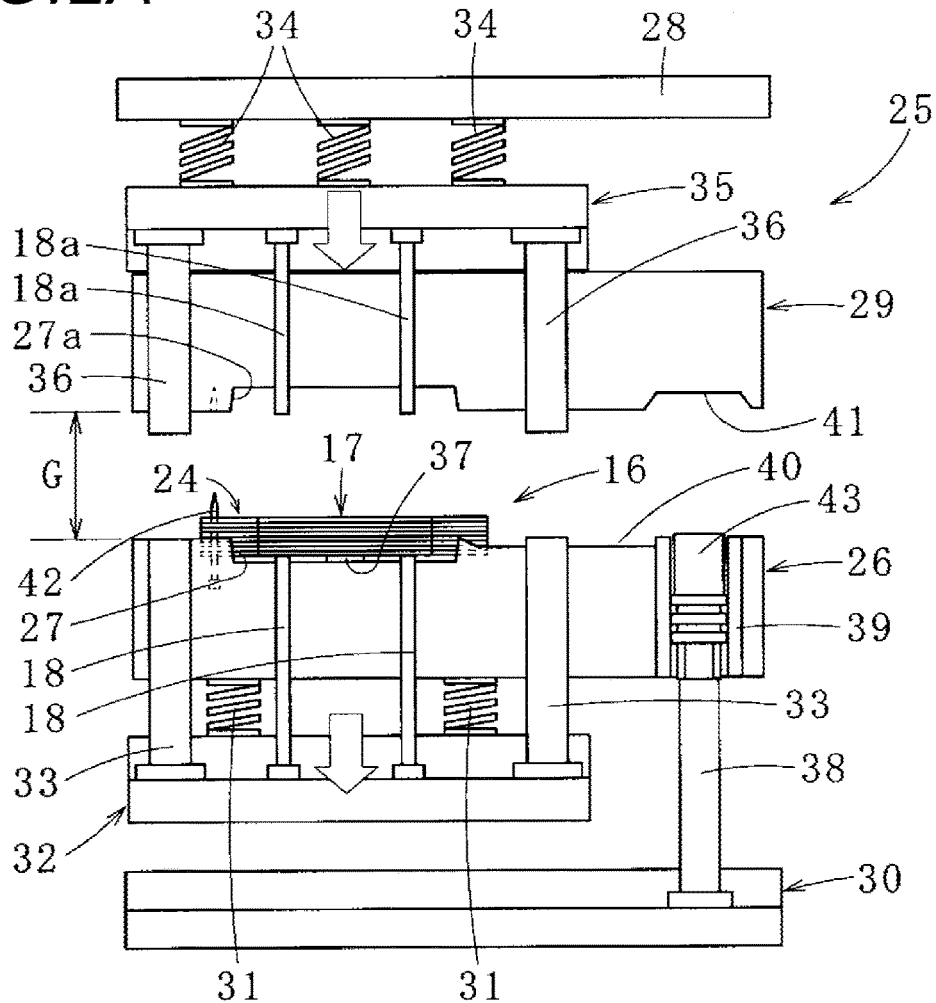
FIG. 2A is a side sectional view of a resin sealing device showing a state that an iron core pieces laminated part is arranged in a resin injection part provided in a lower mold.

A sealing operation by the resin in the mold process is carried out by a resin sealing device 25 shown in FIG. 2A. The resin sealing device 25 includes a lower mold 26 provided so as to be lifted and lowered through a lifting and lowering mechanism relative to a lower frame not shown in the drawing and having recessed lower resin injection parts 27 arranged and provided into which lower parts of the iron core pieces laminated parts 17 of the sheets laminated body 16 are respectively inserted, an upper frame 28 arranged at a prescribed height position relative to the lower frame, an upper mold 29 arranged in the upper frame 28 and at a prescribed upper height position of the lower mold 26 through a support member not shown in the drawing and having recessed upper resin injection parts 27a provided which are respectively paired with the lower resin injection parts 27 and opened downward, and a lifting and lowering base 30 provided between the lower frame and the lower mold 26. In the lower mold 26, an upper surface of the lower mold 26 abuts on a lower surface of the upper mold 29 at its uppermost limit position. At its lowermost limit position, a gap G of a prescribed distance is formed between the upper surface of the lower mold 26 and the lower surface of the upper mold 29. Further, in central parts of the lower resin injection parts 27 respectively, are provided casting cores 37 inserted into central parts of the iron core pieces laminated parts 17 and having upper surfaces abutting on bottom surfaces of the opposed upper resin injection parts 27a when the upper surface of the lower mold 26 abuts on the lower surface of the upper mold 29.

Between the lower mold 26 and the lifting and lowering base 30, a lower mold attached base 32 is provided which is suspended on a lower surface of the lower mold 26 in a horizontal state through a plurality of spring members 31 (one examples of a resilient member). In the lower mold attached base 32, are provided the plurality of lower pressing pins 18 which have lower parts fixed to the lower mold attached base 32 through springs (one examples of a resilient member) not shown in the drawing and upper parts respectively protruding from bottom parts of the lower resin injection parts 27 and a plurality of lower guide posts 33 which have lower parts fixed to the lower mold attached base 32 and upper sides passing through the lower mold 26. Further, between the upper mold 29 and the upper frame 28, an upper mold attached base 35 is provided which is suspended on a lower surface of the upper frame 28 in a horizontal state through a plurality of spring members 34 (one examples of a resilient member). Then, in the upper mold attached base 35, are provided the plurality of upper pressing pins 18a which have upper parts fixed to the upper mold attached base 35 through springs (one examples of a resilient member) not shown in the drawing and lower parts protruding respectively from the bottom parts of the upper resin injection parts 27a and a plurality of upper guide posts 36 which are paired with the lower guide posts 33 and have upper parts fixed to the upper mold attached base 35 and lower sides passing through the upper mold 29.

Further, in the lower mold 26, are respectively formed a pot 39 which passes through the lower mold 26 and into which an end side of a plunger 38 having a lower part fixed to the lifting and lowering base 30 is inserted from a lower part of the lower mold 26 to heat a charged sealing resin 43 and melt the resin, and a groove shaped resin passage (a runner) 40 which connects an upper side of the pot 39 to upper parts of the lower resin injection parts 27 respectively to serve as a passage when the molten resin 43 in the pot 39 is moved toward the lower resin injection parts 27. On the other hand, in the upper mold 29, a recessed part 41 is formed which covers an upper end of the pot 39 and end parts of the resin passages 40 respectively in the pot 39 side to form a resin reservoir part in the upper part of the pot 39 when the upper surface of the lower mold 26 is allowed to abut on the lower surface of the upper mold 29. A plurality of pilot pins 42 are provided which are respectively allowed to stand upright in the lower mold 26 and inserted into the through parts 23 of the sheets laminated body 16 to position the sheets laminated body 16 relative to the lower mold 26.

With such a structure, the lower mold 26 is arranged at its lowest limit position to insert the sheets laminated body 16 into the gap G formed between the lower mold 26 and the upper mold 29 and align the sheets laminated body 16 so that the pilot pins 42 are inserted into the through parts 23 of the sheets laminated body 16 and the sheets laminated body 16 is lowered. Then, as shown in FIG. 2A, the casting cores 37 of the lower resin injection parts 27 respectively pass through the central parts of the iron core pieces laminated parts 17 and ends of the plurality of lower pressing pins 18 which protrude from the bottom surfaces of the lower resin injection parts 27 abut on the lower surfaces of the iron core pieces laminated parts 17 so that the lower parts of the iron core pieces laminated parts 17 are accommodated in the lower resin injection parts 27. FIG. 2A shows a state that one of the plurality of iron core pieces laminated parts 17 which are arranged and provided in the sheets laminated body 16 is accommodated in the lower resin injection part 27.

Figure 2B:
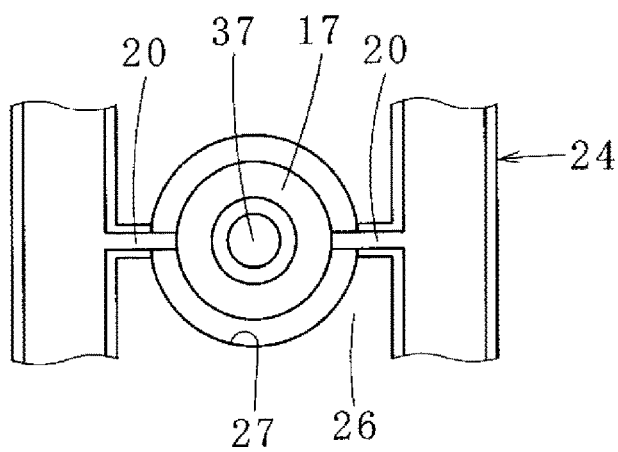
FIG. 2B is a plan view of the iron core pieces laminated part arranged in the resin injection part.

As shown in FIG. 2B, between an inner side surface of the lower resin injection part 27 and an outer peripheral surface of the iron core pieces laminated part 17, and between an inner peripheral surface of the iron core pieces laminated part 17 and an outer side surface of the casting core 37 respectively, gaps (for instance, 0.1 to 3 mm) are formed.

Figure 3A:
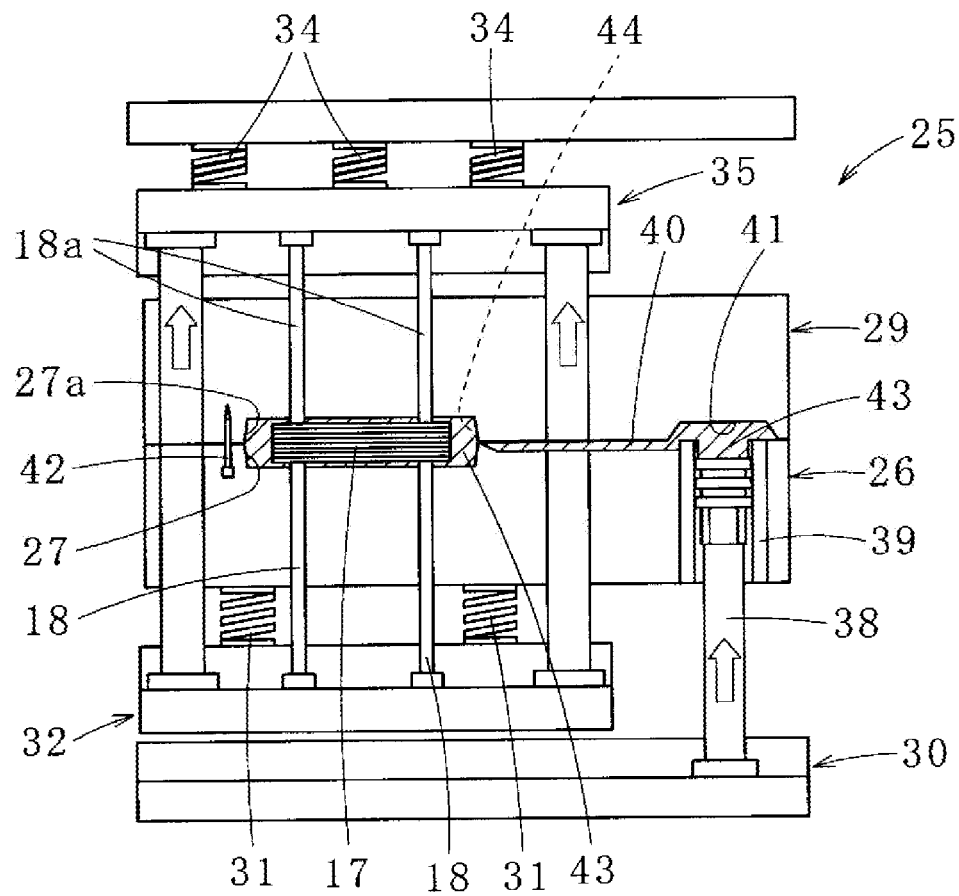
FIG. 3A is a side sectional view of the resin sealing device showing a state that the iron core pieces laminated part is sealed by a resin.

Then, when the lower mold 26 is lifted so that the upper surface of the lower mold 26 is allowed to abut on the lower surface of the upper mold 29, the lower resin injection parts 27 of the lower mold 26 are combined with the opposed upper resin injection parts 27a of the upper mold 29 to form cavities 44 respectively. As shown in FIG. 3A, inside the cavities 44, the iron core pieces laminated parts 17 arranged and provided in the sheets laminated body 16 are respectively accommodated. At this time, the lower pressing pins 18 which respectively protrude from the bottom surfaces of the lower resin injection parts 27 of the lower mold 26 are pressed downward through the lower surfaces of the iron core pieces laminated parts 17 so that the springs provided between the lower pressing pins 18 and the lower mold attached base 32 are contracted. Accordingly, a reaction force generated in the springs acts on the lower surfaces of the iron core laminated parts 17 through the lower pressing pins 18. On the other hand, since the upper pressing pins 18a which protrude from the bottom surfaces of the upper resin injection parts 27a of the upper mold 29 are respectively pressed upward through the upper surfaces of the iron core pieces laminated parts 17 so that the springs provided between the upper pressing pins 18a and the upper mold attached base 35 are contracted, a reaction force generated in the springs acts on the upper surfaces of the iron core pieces laminated parts 17 through the upper pressing pins 18a. As a result, the iron core pieces laminated parts 17 in the cavities 44 are pressed from upward and downward directions through the upper pressing pins 18a and the lower pressing pins 18.

Lengths and spring coefficients of the upper and lower pressing pins 18a and 18 are previously adjusted. Thus, when the iron core pieces laminated parts 17 are accommodated in the cavities 44, gaps of, for instance, 0.1 to 3 mm, are formed between the upper surfaces of the iron core pieces laminated parts 17 and the bottom surfaces of the upper resin injection parts 27a and between the lower surfaces of the iron core pieces laminated parts 17 and the bottom surfaces of the lower resin injection parts 27.

Figure 3B:
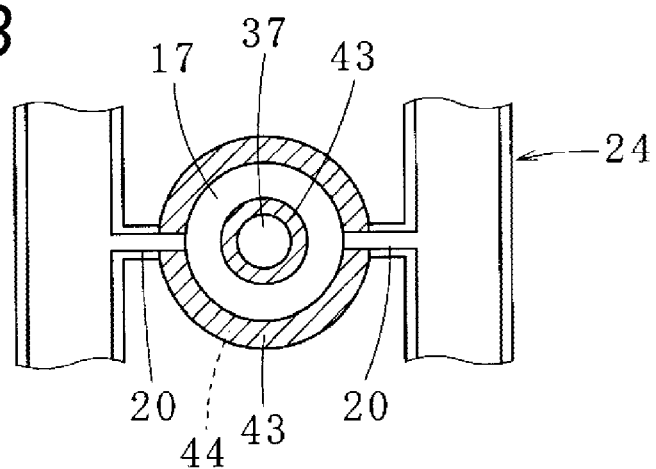
FIG. 3B is a plan view of the iron core laminated part which is being sealed by the resin in the resin injection part.

Further, when the upper surface of the lower mold 26 is allowed to abut on the lower surface of the upper mold 29, openings of the groove shaped resin passages 40 (excluding the end parts in the pot 39 side) are respectively closed by the lower surface of the upper mold 29. The upper end of the pot 39 and the end parts of the resin passages 40 in the pot side 39 are respectively covered with the recessed part 41 of the upper mold 29 to form the resin reservoir part. Accordingly, when the resin 43 charged in the pot 39 is heated and molten, and then, the lifting and lowering base 30 is lifted to press the plunger 38 upward in the pot 39, the resin reservoir part is filled with the molten resin 43, and then, the resin 43 passes the resin passages 40 and enters the cavities 44. The resin 43 which enters the cavities 44 is spread in the cavities 44 so that the gaps between inner surfaces of the cavities 44 and the outer peripheral surfaces of the iron core pieces laminated parts 17 and the gaps between the inner peripheral surfaces of the iron core pieces laminated parts 17 and the outer side surfaces of the casting cores 37 are gradually filled with the resin 43, as shown in FIG. 3B. When the resin 43 which is used here is a thermosetting resin, after the injection of resin 43 to the cavities 44 is finished, the upper mold 29 and the lower mold 26 are heated to a prescribed temperature by a heater to harden the resin. Further, when the resin 43 is a thermoplastic resin, after the injection of the resin 43 to the cavities 44 is finished, the upper mold 29 and the lower mold 26 are cooled to a prescribed temperature under a state that the upper mold 29 is allowed to abut on the lower mold 26 to harden the resin. In such a way, since the iron core pieces laminated parts 17 in which the iron core pieces 11 are laminated are sealed by the resin and formed integrally under a state that they are pressurized from the upward and downward directions, the original iron cores 19 are formed in which the iron core pieces 11 are more closely and strongly bonded together.

Figure 4A:
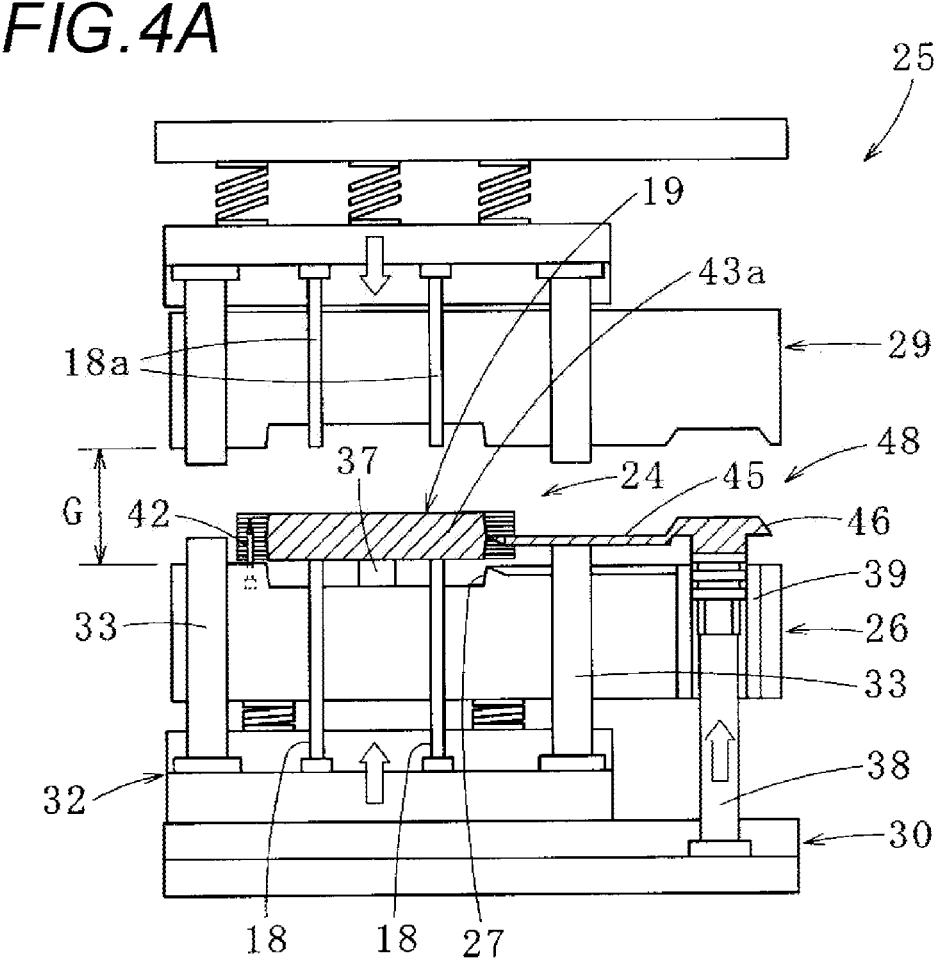
FIG. 4A is a side sectional view of the resin sealing device showing a state that the iron core pieces laminated part sealed by the resin is taken out from the resin injection part.

After the resin 43 which is injected to the cavities 44 is hardened, the lower mold 26 and the lifting and lowering base 30 are synchronously lowered to return the lower mold 26 to its lowest limit position, so that the gap G is provided between the upper surface of the lower mold 26 and the lower surface of the upper mold 29. Then, as shown in FIG. 4A, when the lifting and lowering base 30 is lifted again, the upper surface of the lifting and lowering base 30 abuts on the lower surface of the lower mold attached base 32. After that, the lifting and lowering base 30 and the lower mold attached base 32 are lifted together. As a result, the lower mold attached base 32 comes close to the lower mold 26, the upper parts of the lower guide posts 33 protrude from the upper surface of the lower mold 26 and the upper parts of the lower pressing pins 18 protrude from the bottom surfaces of the lower resin injection parts 27.

When the upper parts of the lower pressing pins 18 protrude from the bottom surfaces of the lower resin injection parts 27, the pre-formed laminated iron cores 19 are raised from the lower resin injection parts 27 so that the casting cores 37 are slipped out from the pre-formed laminated iron cores 19. As the pre-formed laminated iron cores 19 are raised, the frames laminated part 24 is also lifted. Thus, the pilot pins 42 are slipped out from the through parts 23 of the frames laminated part 24. Further, a runner part resin 45 hardened in the resin passages 40 connected to the pre-formed laminated iron cores 19 is lifted together with the pre-formed laminated iron cores 19. A cull 46 connected to the runner part resin 45 and having the resin hardened in the resin reservoir part and the resin hardened in the pot 39 is raised by the plunger 38. Thus, a resin sealed laminated body 48, can be taken out from the resin sealing device 25, which includes the frames laminated part 24, the plurality of pre-formed laminated iron cores 19 arranged inside the frames laminated part 24 and respectively connected to the insides of the nearest frames laminated part 24 through the bridge pieces laminated parts 20, the runner part resin 45 and the cull 46.

Figure 4B:
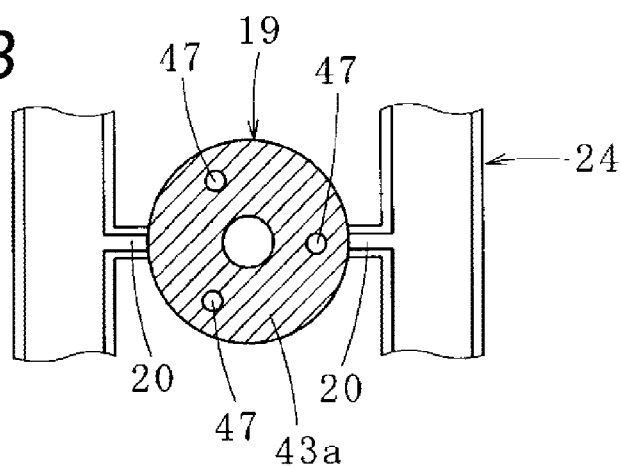
FIG. 4B is a plan view of the iron core pieces laminated part sealed by the resin which is arranged in the resin injection part.

Here, as shown in FIG. 4B, on resin layers 43a of the upper surfaces (similar in the lower surfaces of the pre-formed laminated iron cores 19) of the pre-formed laminated iron cores 19, since end parts of the upper pressing pins 18a abut on the upper surfaces of the iron core pieces laminated parts 17, parts which are not filled with the resin 43 are formed. Thus, amorphous metal exposed parts 47 are present. The exposed parts 47 may be refilled with an adhesive agent or a resin as required.

The lower pressing pins 18 and the upper pressing pins 18a are respectively supposed to have circular sectional forms. However, as shown in FIG. 5A, may be used pressing pins with sectional forms by which forms of amorphous metal exposed parts 49 configured on the resin layers 43a which cover the upper and lower surfaces of the iron core pieces laminated parts 17 are sector. As shown in FIG. 5B, may be used pressing pins with sectional forms by which forms of amorphous metal exposed parts 50 configured on the resin layers 43a which cover the upper and lower surfaces of the iron core pieces laminated parts 17 are annular. When the sectional forms of the pressing pins are sector or annular, the upper and lower surfaces of the iron core pieces laminated parts 17 can be pressed to a wide range, so that an adhesion of the iron core pieces 11 can be improved.

In the separating process for forming the individual laminated iron cores, in the resin sealed laminated body 48, the bridge pieces laminated parts 20 which connect the pre-formed laminated iron cores 19 to the frames laminated part 24 are separated from the pre-formed laminated iron cores 19. Thus, as shown in FIGS. 1E and 1F, the individually separated laminated iron cores 21 are formed. Here, since connection parts of the bridge pieces laminated parts 20 and the pre-formed laminated iron cores 19 are removed by separating the bridge pieces laminated parts 20, on side surfaces (outer peripheral surfaces) of the laminated iron cores 21, amorphous metal exposed parts 51 are formed.

Subsequently, the laminated iron core 21 manufactured by the manufacturing method for the laminated iron core according to the one exemplary embodiment of the present invention will be described below.

Figure 6A:
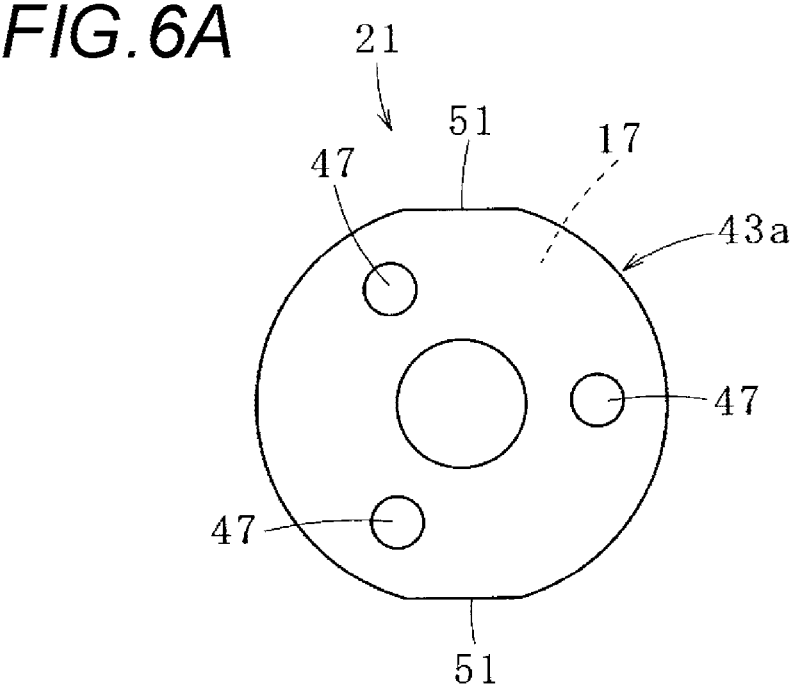
FIG. 6A is a plan view of the laminated iron core manufactured by the manufacturing method for the laminated iron core according to the one exemplary embodiment of the present invention.
Figure 6B:
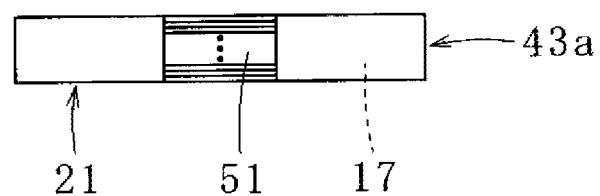
FIG. 6B is a front view of the laminated iron core manufactured by the manufacturing method for the laminated iron core according to the one exemplary embodiment of the present invention.
Figure 7A:
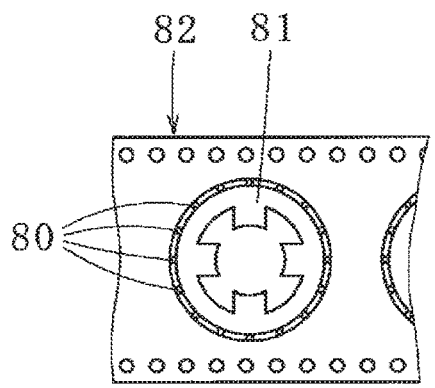
FIG. 7A and FIG. 7B are an explanatory view of an iron core piece formed on a thin metal sheet and an explanatory view of a laminated state of the thin metal sheets respectively in a manufacturing method for a laminated iron core according to a usual example.
Figure 7B:
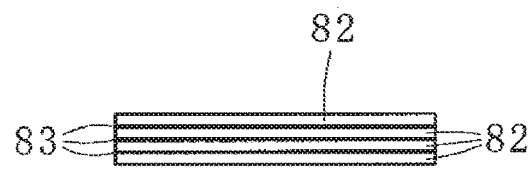
Figure 8:
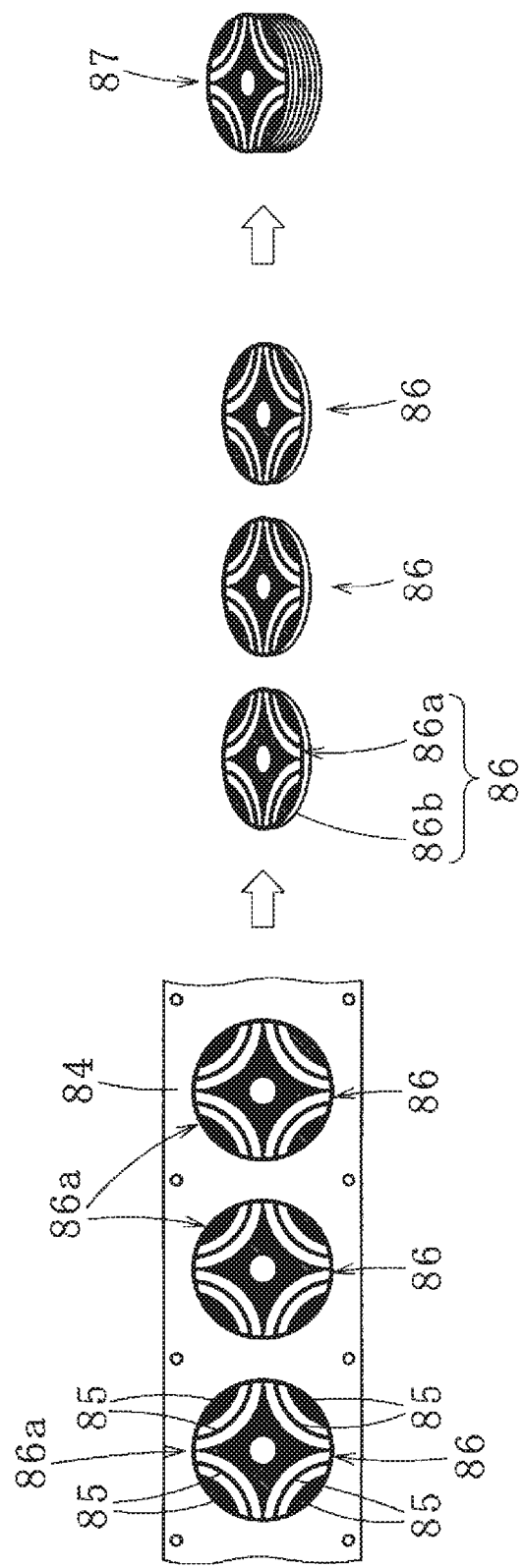
FIG. 8 is an explanatory view when iron core piece form parts made from a thin metal sheet are laminated to obtain a laminated iron core in a manufacturing method for a laminated iron core according to another usual example.
Figure 9:
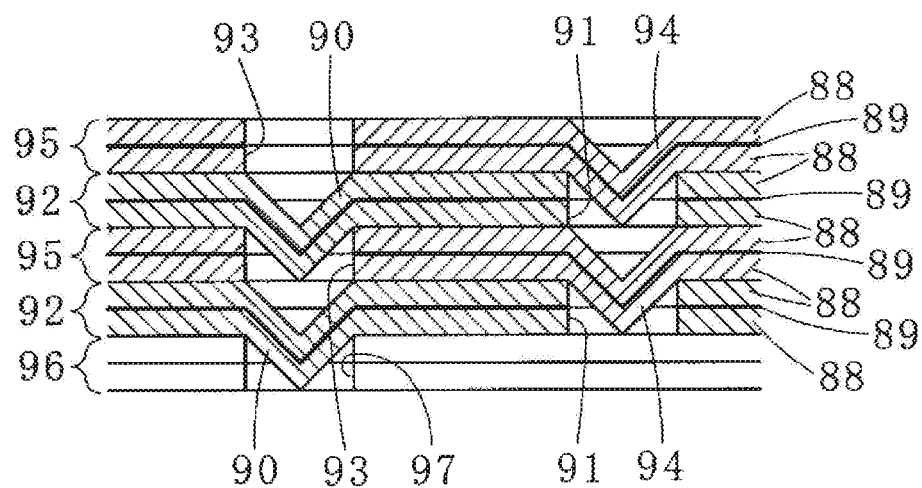
FIG. 9 is an explanatory view when a laminated iron core is formed by caulking and connecting together laminated iron core pieces obtained from a metal sheet material in a manufacturing method for a laminated iron core according to a still another usual example.

As shown in FIGS. 6A and 6B, in the laminated iron core 21, a part of the iron core pieces laminated part 17 with the iron core pieces 11 laminated from which a part (serving as the exposed parts 47) of the upper and lower surfaces and a part (serving as the exposed parts 51) of the outer peripheral surfaces are excluded is uniformly coated with the resin layer 43a and integrally formed. Accordingly, when the laminated iron core 21 is conveyed, an impact can be prevented from being directly applied to the iron core pieces 11 or peripheral members can be prevented from being caught in the iron core pieces 11 to break the connection of the iron core pieces 11 so that the laminated iron core 21 is broken or flaws are generated in the laminated iron core 21. Thus, the laminated iron cores 21 are easily handled and a productivity of the laminated iron cores 21 is improved.

Further, the iron core pieces laminated part 17 is sealed by the resin to bond the iron core pieces 11 together. For instance, a form work for a caulking connection or a welding work is not directly applied to the iron core pieces 11. Accordingly, in the iron core pieces 11, a residual stress or a working part is not present which deteriorates a property of the laminated iron core 21. Thus, the laminated iron core 21 whose performance is excellent can be manufactured.

The present invention is described above by referring to the exemplary embodiment. However, the present invention is not limited to the structure described in the above-mentioned exemplary embodiment and may include other exemplary embodiments or modified examples which are considered within a range of matters described in claims.

For instance, in the present exemplary embodiment, for sealing by a resin, a transfer molding is used in which the resin molten in the pot is extruded to the cavities by the plunger, an injection molding or a compression molding may be suitably selected depending on the form of the iron core pieces laminated part, an efficiency of a sealing operation by the resin, kinds of the resin (the thermosetting resin or the thermoplastic resin) or the like.

Further, in the present exemplary embodiment, the product sheet is formed in which the plurality of annular iron core pieces are arranged in one row in the outer frame piece and the iron core pieces are respectively connected to the outer frame piece with the outer peripheral sides of the iron core pieces connected to the nearest inner peripheral sides of the outer frame piece through the bridge pieces. However, a product sheet may be formed which has a structure that iron core pieces are arranged longitudinally and transversely in an outer frame piece, outer peripheral sides of the iron core pieces are connected to nearest inner peripheral sides of the outer frame piece through bridge pieces and the iron core pieces which are adjacent in a longitudinal direction or a transverse direction or an oblique direction are connected together by second bridge pieces. In this case, bridge pieces laminated parts and second bridge pieces laminated parts (members obtained by laminating the second bridge pieces in a vertical direction) are separated from pre-formed laminated iron cores to form individually separated laminated iron cores. Thus, the number of laminated iron cores formed from one sheets laminated body is increased, so that a productivity of the laminated iron cores is more improved.

Further, in the present exemplary embodiment, the metal sheet having the configuration of a long strip of paper is used as the amorphous metal sheet. However, an electromagnetic steel sheet may be used. Thus, the electromagnetic steel sheet may be used to form a laminated iron core having no caulking and connecting parts.

Further, in the present exemplary embodiment, the metal sheet having the configuration of a long strip of paper is used. However, a belt shaped metal sheet (a reel shaped metal sheet) may be used in place of the above-described metal sheet. In the case of the reel shaped metal sheet, when the injection molding is used in the mold process, the productivity can be more improved.

What is claimed is:

1. A manufacturing method for laminated iron cores, the manufacturing method comprising:

processing a metal sheet having a configuration of a long strip or a belt to form a plurality of product sheets, in each of which a plurality of iron core pieces are arranged inside an outer frame piece and the plurality of iron core pieces are connected to the outer frame piece in such a way that outer peripheral sides of the iron core pieces are connected to nearest parts of the outer frame piece through bridge pieces;

the plurality of iron core pieces being formed within a continuous aperture of a corresponding product sheet and the bridge pieces being formed at the outer peripheries of the iron core pieces so as to connect the iron core pieces to an inner periphery that defines the continuous aperture of the corresponding product sheet;

laminating the plurality of product sheets to form a sheets laminated body, wherein the sheets laminated body includes iron core pieces laminated parts in which the iron core pieces are laminated in the vertical direction, bridge pieces laminated parts in which the bridge pieces are laminated in the vertical direction and outer frame pieces laminated parts in which the outer frame pieces are laminated in the vertical direction, when laminating, selectively fixing the plurality of product sheets adjacent to each other in a vertical direction together by predetermined connection processing on at least one of: (i) parts of the plurality of product sheets, (ii) parts of the bridge pieces, and (iii) parts of the outer frame pieces, wherein the plurality of iron core pieces are excluded from the connection processing;

when laminating, pressing the iron core pieces laminated parts by a pressing member and then starting injecting a resin while being pressed by the pressing member to seal the iron core pieces laminated parts, thereby forming pre-formed laminated iron cores; and separating the bridge pieces laminated parts from the pre-formed laminated iron cores to form the laminated iron cores which are individually separated.

2. The manufacturing method according to claim 1, wherein the plurality of product sheets are laminated to each other such that the iron core pieces are arranged in columns and rows, the iron core pieces which are adjacent in a longitudinal direction, a transverse direction or an oblique direction are respectively connected together by second bridge pieces, and the bridge pieces laminated parts and second bridge pieces laminated parts in which the second bridge pieces are laminated in the vertical direction are separated from the pre-formed laminated iron cores to form the laminated iron cores which are individually separated.

3. The manufacturing method according to claim 1, wherein the metal sheet is an amorphous metal sheet.

4. The manufacturing method according to claim 1, wherein each laminated iron core is covered with a resin layer, and wherein a topmost product sheet and a bottommost product sheet of the product sheets remain exposed without resin-sealing at parts of outer surfaces thereof and at an outer peripheral surface of the laminated iron core due to pressing the iron core pieces laminated parts together via the pressing member.

5. The manufacturing method according to claim 4, wherein the pressing member comprises pressing pins.

6. The manufacturing method according to claim 1, wherein said predetermined connection processing is performed by caulking and connecting using caulking and connecting parts formed on the at least one of: (i) the parts of the plurality of product sheets, (ii) the parts of the bridge pieces, and (iii) the parts of the outer frame pieces.

7. The manufacturing method according to claim 1, wherein said predetermined connection processing is performed by bonding through an adhesive agent provided on the at least one of: (i) the parts of the plurality of product sheets, (ii) the parts of the bridge pieces, and (iii) the parts of the outer frame pieces.

8. The manufacturing method according to claim 1, wherein said predetermined connection processing is performed by welding at least one of: (i) the parts of the plurality of product sheets, (ii) the parts of the bridge pieces, and (iii) the parts of the outer frame pieces.

* * * * *